(12) United States Patent
Nambu

(10) Patent No.: US 6,452,183 B1
(45) Date of Patent: Sep. 17, 2002

(54) NUCLEAR MEDICAL DIAGNOSIS APPARATUS AND IMAGE RECONSTRUCTION METHOD THEREFOR

(75) Inventor: Kyojiro Nambu, Nasu-gun (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 96 days.

(21) Appl. No.: 09/659,816

(22) Filed: Sep. 11, 2000

(30) Foreign Application Priority Data

Sep. 13, 1999 (JP) ............................................ 11-258777

(51) Int. Cl.[7] .............................................. G01T 1/164
(52) U.S. Cl. ............................ 250/363.04; 250/363.07; 378/901; 382/131
(58) Field of Search ....................... 250/363.04, 363.07; 378/22, 901; 382/276, 131, 279, 280

(56) References Cited

U.S. PATENT DOCUMENTS 4,149,248 A * 4/1979 Pavkovich ................... 378/15
4,654,795 A * 3/1987 Shimoni ..................... 364/414
4,752,691 A * 6/1988 Hawman ................. 250/363 S
5,324,946 A   6/1994 Ichihara et al.

FOREIGN PATENT DOCUMENTS

EP          0 519 445          12/1992

* cited by examiner

Primary Examiner—Seungsook Ham
Assistant Examiner—Tim Moran
(74) Attorney, Agent, or Firm—Oblon, Spivak, McClelland, Maier & Neustadt, P.C.

(57) ABSTRACT

A nuclear medical diagnosis apparatus comprises a detector configured to detect gamma rays emitted from radioisotopes administered to a target object, a mechanism configured to move the detector with respect to the target object, a correcting unit configured to correct projection data, detected by the detector, on the basis of other projection data detected at a plurality of positions associated with a line which passes through a detection position of the projection data and crosses a detection surface of the detector at a predetermined angle, and a unit configured to generate a radioisotope density distribution on the basis of the corrected projection data.

14 Claims, 8 Drawing Sheets

NUCLEAR MEDICAL DIAGNOSIS APPARATUS AND IMAGE RECONSTRUCTION METHOD THEREFOR

CROSS-REFERENCE TO RELATED APPLICATIONS

This application is based upon and claims the benefit of priority from the prior Japanese Patent Application No. 11-258777, filed Sep. 13, 1999, the entire contents of which are incorporated herein by reference.

BACKGROUND OF THE INVENTION

The present invention relates to a nuclear medical diagnosis apparatus and image reconstruction method therefor, wherein gamma rays emitted from radioisotopes (RIs) administered to a target object are detected from many directions, and the RIs density distribution is generated on the basis of detection data (projection data).

Many systems are commercially available, which can generate not only a planar image upon projecting an RIs density distribution in one direction but also the density distribution of slices of a target object, like X-ray computer tomography apparatuses. Techniques for imaging the slice density distributions are classified into SPECT (Single Photon Emission Computed Tomography) and PET (Positron Emission computed Tomography) depending on the nuclides.

In SPECT, a single photon nuclide is administered to the target object. To count the number of photons, a gamma ray emitted from the single photon nuclide is detected. A detector is rotated through a small angle, and the gamma ray is counted at this rotation position again. The gamma ray is repeatedly counted at many positions while the detector is rotated step by step. The density distribution in the slice is reconstructed by calculating the multi-directional projection data acquired by repeating the counting operation. In PET, a positron nuclide is administered to the target object. Two photons generated when the positron emitted by the positron nuclide combines with a neighboring negative electron and disappears are simultaneously counted to reconstruct the nuclide density distribution in the slice.

Figure 1:
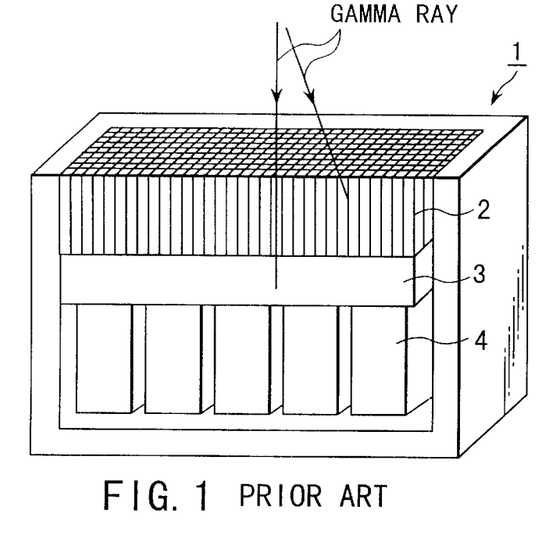
FIG. 1 is a schematic view showing a conventional detector.

FIG. 1 is a schematic view showing the arrangement of a detector used in a conventional nuclear medical diagnosis apparatus. A detector 1 has a function of measuring the incident position of a gamma ray and its energy in real time. A thick lead plate formed with a plurality of small holes densely, i.e., collimator 2 is arranged on the detection surface of the detector 1. The collimator 2 can be of a parallel hole type in which the holes are parallel to each other and perpendicular to the detection surface, a slant hole type in which the holes are parallel to each other and slant with respect to the detection surface, a diverging type in which the holes are formed in an outwardly diverging pattern, or a converging type in which the holes are formed in a pattern having a focal point formed outside the collimator. The parallel hole type collimator is exemplified here.

One photon of a gamma ray passing through the collimator 2 is incident on a scintillator 3 of several ten cm square and converted into several thousand to several ten-thousand low-energy photons. These photons are detected by a number of photomultiplier tubes (PMTs) 4. The incident position of the gamma ray can be calculated with a precision of about 3 mm by comparing the output levels of the PMTs 4. This allows measuring projection data obtained by projecting an RIs 3D concentration distribution in the target object on a 2D plane. This measurement operation is repeated for the target object at various angular positions. As in the X-ray CT apparatus, images are reconstructed on the basis of the projection data to simultaneously acquire a large number of tomographic images.

Figure 2:
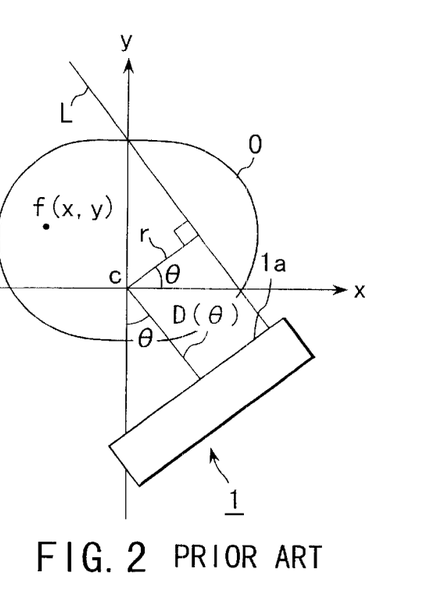
FIG. 2 is a view showing a conventional SPECT coordinate system.

As shown in FIG. 2, to move the detector along the track nearest to the target object O, the distance (rotation radius) $D(\theta)$ between rotation center C of the detector 1 and the detection surface $1a$ changes depending on the rotational angle $\theta$.

In the SPECT apparatus, the detector 1 can measure the 2D projection data, and the 3D RI concentration distribution $f(x,y,z)$ can be calculated on the basis of the measured projection data. To reconstruct an image, a slice (x-y plane) perpendicular to the rotational axis (body axis of the target object O, i.e., z-axis) is regarded as the reconstructing unit. Image reconstruction is essentially a 2D process.

From the RI density distribution $f(x, y)$ in the target object O, projection data $p(r, \theta)$ is represented by:

$$p(r, \theta) = \int_{-\infty}^{\infty} f(x, y) ds \qquad (1)$$

where r is the distance from the rotation center C to a projection ray L defining the direction of the collimator 2 and where in FIG. 2, the integration along the projection ray L is indicated by $\int ds$ (i.e., the component orthogonal to r is represented by s).

Since integration is performed along the projection ray L, we have:

$$\begin{bmatrix} x \\ y \end{bmatrix} = \begin{bmatrix} \cos\theta & -\sin\theta \\ \sin\theta & \cos\theta \end{bmatrix} \begin{bmatrix} r \\ s \end{bmatrix} \qquad (2)$$

The transform from the RI density distribution f to the projection data p by equation (2) is called projection transform P, which is expressed as p=Pf. This projection transform is also called a 2D radon transform. Orthogonal coordinates are set as <r, θ>, and a space in which projection data $p(r, \theta)$ is plotted is called an <r, θ> space. This is also called a sinogram.

For example, a convolutional backprojection is used as a technique for calculating an RI density distribution f from the projection data p. This method is practiced in the following procedures.

The projection data $p(r, \theta)$ is convoluted with a reconstruction function h to obtain compensated projection data $q(r, \theta)$ given by:

$$q(r, \theta) = \int_{-\infty}^{\infty} p(t, \theta) h(r - t) dt \qquad (3)$$

The reconstruction function h is a generalized function and expressed as:

$$h(r) = -1/(2\pi r^2)(|r| > 0) \qquad (4)$$
$$\int_{-\infty}^{\infty} h(r) dr = 0$$

In practice, a function $hm(r)$ obtained by convoluting an appropriate smoothing function $n(r)$ with the reconstruction function $h(r)$ and given by:

$$h_m(r) = \int_{-\infty}^{\infty} h(t)n(r-t)\,dt \qquad (5)$$

is used in place of the generalized function.

The corrected projection data q is backprojected by calculating:

$$f(x,y) = \frac{1}{\pi}\int_0^{\pi} q(x\cos\theta + y\sin\theta, \theta)\,d\theta \qquad (6)$$

The backprojection is calculated by integrating points (x,y) on the RI density distribution. In practice, however, data $f\theta(x,y)$ (=$q(\times\cos\theta+y\sin\theta, \theta)$) transformed the corrected projection data $q(r, \theta)$ into (x,y) coordinates is generated and accumulated in units of rotation angles.

Figure 3:
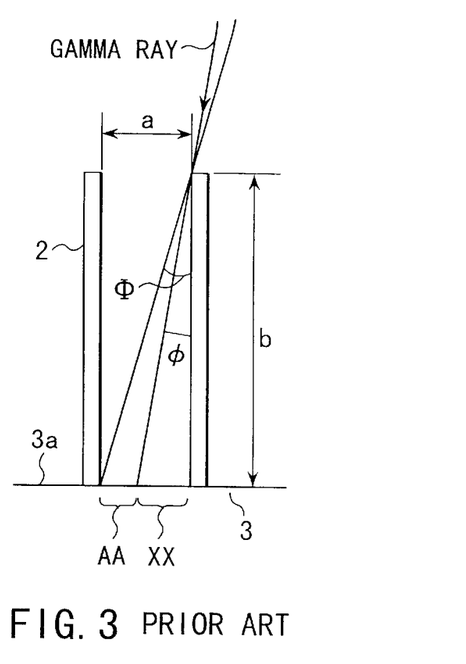
FIG. 3 is a view for explaining the angle of divergence of the directivity in a conventional collimator.

FIG. 3 shows the track of a gamma ray passing through one collimator hole in the parallel hole type collimator. The depth and width of one collimator hole are defined as b and a, respectively. Assume a gamma ray incident obliquely at an angle $\phi$ with respect to the axis of the collimator hole 2.

As is known well, a collimator has directivity for selectively transmitting only gamma rays incident from a specific direction. This directivity is not sharp but has an angle of divergence depending on the depth b and width a of the collimator hole 2. That is, the detector has sensitivity within the angle of divergence. In other words, the sensitivity is not zero within the angle of divergence (tan $|\phi|$>a/b). A maximum angle is represented "$\Phi$", a minimum angle is represented "$-\Phi$". When an incidence angle of gamma rays is within $-\Phi$ to $\Phi$, the detector has sensitivity for the gamma rays.

The sensitivity is the ratio of the area of the gamma ray arrival region to the area of the total region (AA+XX) of the detection channel. If the maximum sensitivity is 1, $\phi\neq 0$, i.e., the obliquely incident gamma ray arrival region is AA, and the remaining region XX is a dead zone. The sensitivity is, therefore, given by AA/(AA+XX).

Figure 4:
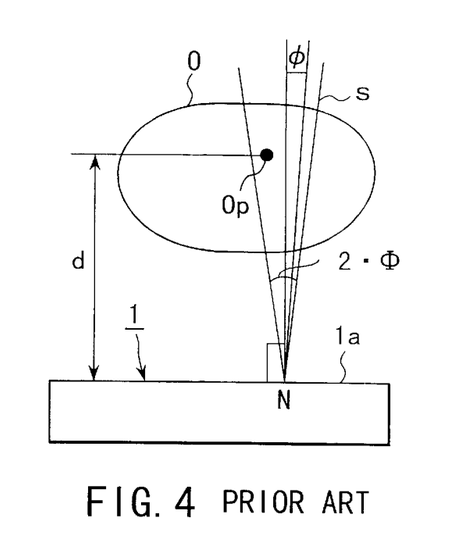
FIG. 4 is a view showing the incident angle dependence of detection sensitivity in the conventional collimator.

The detection sensitivity changes depending on the incident angle $\phi$, as shown in FIG. 4. This is called "incident angle dependence of detection sensitivity". The incident angle dependence $S(\phi)$ of detection sensitivity is represented by a function shown in FIG. 5. If $|\phi|>\Phi$, then $s(\phi)=0$.

The angle of divergence thus decreases the resolution of the detector. A decrease in resolution increases as the distance d between the detection surface 1a and an RI position Op increases (distance dependence of resolution).

No practical technique has been proposed to date, which can effectively suppress any decrease in resolution and any distance dependence of resolution, which are caused by the fact the collimator directivity has a predetermined angle of divergence. In a theory, this can be formulated as a reverse solution. A method of solving a optimum solution can be obtained. But a large quantity of a calculation is needed to execute this method, this quantity is unreality in a practical use.

BRIEF SUMMARY OF THE INVENTION

It is an object of the present invention to effectively suppress any decrease in resolution and any distance dependence of resolution which are caused by that fact collimator directivity has a certain angle of divergence in a nuclear medical diagnosis apparatus, and an image reconstruction method used in this apparatus.

A nuclear medical diagnosis apparatus according to the present invention comprises a detector configured to detect gamma rays emitted from radioisotopes administered to a target object, a mechanism configured to move the detector with respect to the target object, a correcting unit configured to correct projection data, detected by the detector, on the basis of other projection data detected at a plurality of positions associated with a line which passes through a detection position of the projection data and crosses a detection surface of the detector at a predetermined angle, and a unit configured to generate a radioisotope density distribution on the basis of the corrected projection data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The preferred embodiments of the present invention will be described with reference to the accompanying drawing.

First Embodiment

The first embodiment of the present invention exemplifies a single photon emission computed tomography (SPECT) apparatus in which the collimator of a detector is constructed of a parallel hole type collimator for transmitting only gamma rays incident almost perpendicularly to a gamma ray detection surface. The first embodiment of the present invention also corresponds to a case in which the distance from the assumed rotation center to the detection surface of the detector is changed in accordance with the rotation angle.

Figure 6:
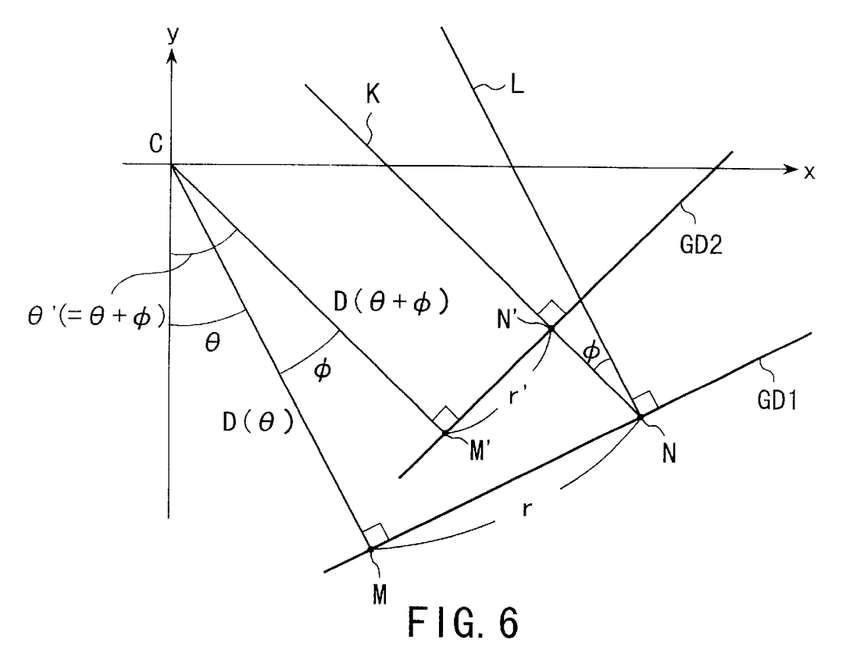
FIG. 6 is a view for explaining the principle of a method of correcting projection data according to the first embodiment of the present invention.

FIG. 6 is a view for explaining the principle of a projection data correcting method according to the first embodiment. Referring to FIG. 6, reference symbol M denotes a cross point of perpendicular line to a detection surface GD1 from an assumed rotation center C. In moving the detector along the track nearest to the target object, the distance (rotation radius) from the rotation center C to the position M is changed depending on the rotation angle $\theta$ and represented as $D(\theta)$. Reference symbol N denotes a position on the detection surface GD1, where the distance from the rotation center C to a projection ray L becomes r. Reference symbol L denotes a line (projection ray) passing through the position N on the detection surface and crossing with the detection surface GD1 at an axial angle (directivity; in this case 90°) between the collimator hole and the detection surface. When the collimator is ideal and has no incident angle dependence of detection sensitivity, the RI density distribution f(x,y) is integrated at the position N on the detection surface GD1 along the projection ray L. The corresponding projection data is expressed as ideal projection data $p^*(r, \theta)$.

In contrast to this, when the collimator is not ideal, i.e., has incident angle dependence of detection sensitivity, the RI density distribution f(x,y) is integrated in an almost conical region. The practical detecting process is the latter, and the projection data actually detected is expressed as $p(r, \theta)$.

As described above, the projection data $p(r, \theta)$ at the position N has incident angle dependence $S(\phi)$ of detection sensitivity. For example, the projection data $p(r, \theta)$ at the position N contains a data component obtained by multiplying the incident angle dependence $S(\phi)$ with data obtained by integrating the density distribution f(x,y) along a straight line K which passes through the position N and is inclined by an angle $\phi$ from the projection ray L.

The detection surface crossing the straight line K at 90° (collimator directivity) is GD2, and the intersection on the detection surface GD2 is N'. Thus, the corresponding rotation angle $\theta'$ is given by $\theta+\phi$. A position M' on the detection surface GD2 represents the position on the detection surface 2, which is perpendicular to the rotation center C. The distance (rotation radius) from the rotation center C to the position M' is $D(\theta+\phi)$. The distance from the position M' on the detection surface GD2 to the position N' is r'. Ideal projection data obtained by integrating the RI density distribution f(x,y) by the straight line K is $p^*(r', \theta+\phi)$.

The distance r' is defined with respect to r as:

$$r'=r\cos\phi-D(\theta)\sin\phi \quad (7)$$

That is, the distance r' can be specified using r, $\phi$, and $\theta$ and is expressed as r' (r, $\phi$, $\theta$). As can be apparent from the above description, the projection data $p(r, \theta)$ actually detected at the position N is defined as:

$$p(r, \theta) = \int_{-\Phi}^{\Phi} S(\phi) p*(r'(r, \phi, \theta), \theta + \phi) d\phi \quad (8)$$

Equation (8) indicates that the result of smoothing (leveling) the ideal projection data $p^*(r, \theta)$ with the incident angle dependence $S(\phi)$ is detected as the actual projection data $p(r, \theta)$, that is, the actual projection data $p(r, \theta)$ is detected as a result of integrating with the incident angle dependence $S(\phi)$ ideal projection data obtained at a plurality of incident angles $\phi$ within the range of $-\Phi$ to $+\Phi$.

If $\Phi$ is small, $\cos\phi$ and $\sin\phi$ can be approximated with 1 and $\phi$, respectively. Hence, equation (7) can be rewritten as:

$$r'(r,\phi, \theta) \cong r-D(\theta)\phi \quad (9)$$

It is impossible to accurately reconstruct the ideal projection data $p^*$. According to the present invention, however, the actually detected projection data p is corrected using the correcting function adapted to suppress the smoothing effect by the incident angle dependence S, thereby estimating projection data p# approximate to the ideal projection data $p^*$.

Any decrease in resolution and its distance dependence, which are caused by the fact that the collimator directivity has a certain angle of divergence, can be suppressed.

The projection data p correlated to $p^*(r', \theta')$ by equation (8) becomes $p(r(r', \phi, \theta'), \theta'-\phi)$. In this case, $r(r', \phi, \theta')$ can be expressed as:

$$r(r', \phi, \theta')=r'\sec\phi+D(\theta'-\phi)\tan\phi \quad (10)$$

When $\Phi$ is small, the range of $|\phi|$ in which $S(\phi)$ is not zero is small, and equation (10) can be rewritten by approximating sec $\phi$ and tan $\phi$ by 1 and $\phi$, respectively, as:

$$r(r', \phi, \theta') \cong r'+D(\theta)\phi \quad (11)$$

From the foregoing, a correcting function $T(\phi)$ for suppressing the smoothing effect by the incident angle dependence $S(\phi)$ is derived from the incident angle dependence $S(\phi)$, and one-dimensional integration is performed along a curve (straight line if equation (11)) <r, $\theta$>=<r(r', $\phi$, $\theta'$), $\theta'-\phi$)>($|\phi|<\Phi$) in the <r, $\theta$> space represented by equation (10) or equation (11) is used) as follows:

$$p\#(r', \theta') = \int_{-\Phi}^{\Phi} T(\phi) p(r(r', \phi, \theta'), \theta - \phi) d\phi \quad (12)$$

Figure 7:
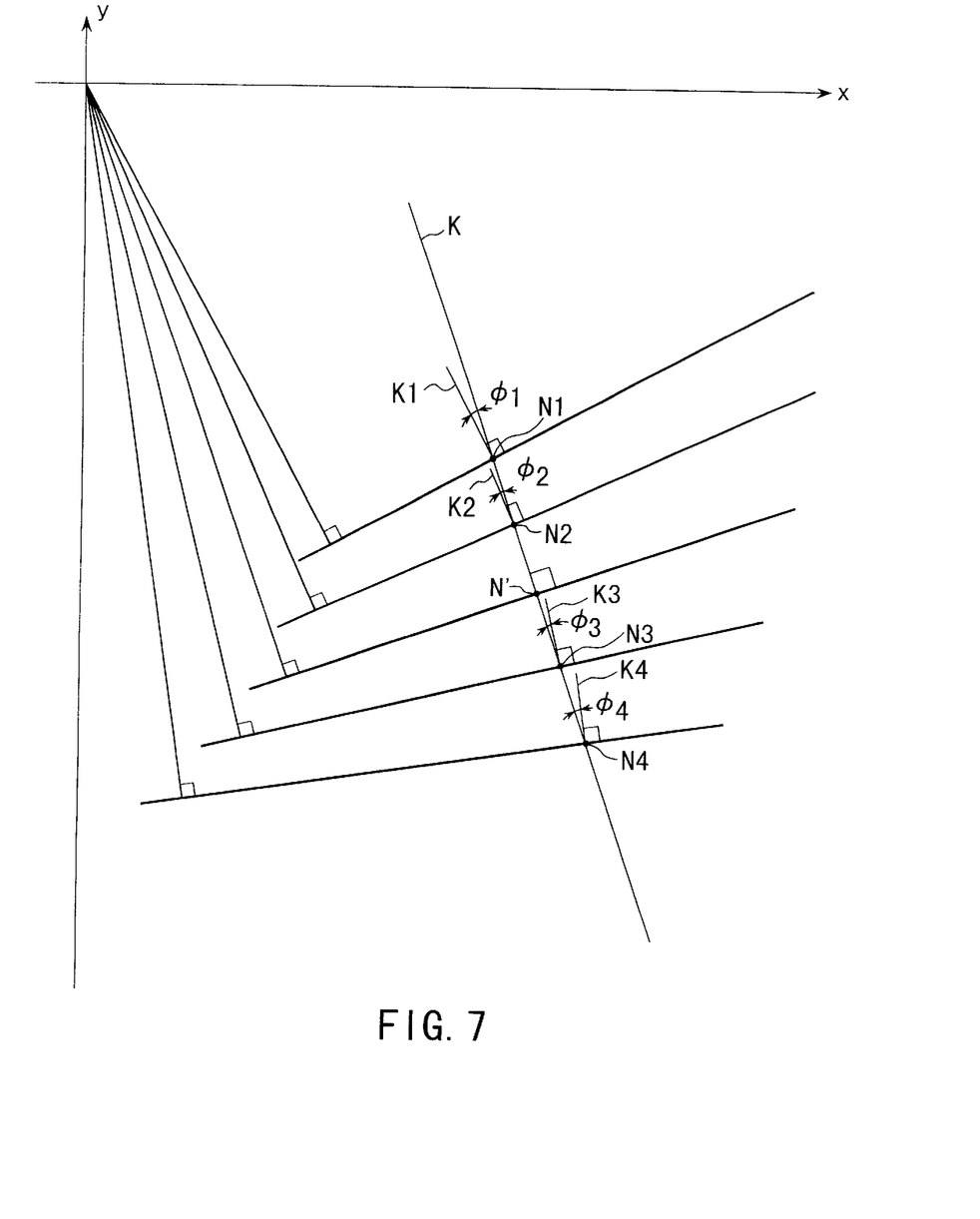
FIG. 7 is a view for explaining the method of correcting projection data according to the first embodiment.

As shown in FIG. 7, equation (12) suggests that the projection data at the position N' on the detection surface GD2 is corrected on the basis of the projection data detected at a plurality of positions N1, N2, N3, N4 . . . on the projection ray K passing through the position N'.

The positions N1, N2, N3, N4 . . . used to correct the projection data at the position N are given such that the projection rays K1, K2, K3, and K4 cross the projection ray K at the position N' within the range of $-\Phi$ to $+\Phi$. That is, the positions N1, N2, N3, N4 . . . correspond to the positions at which gamma rays obliquely incident on the position N' at incident angles $\phi 1$, $\phi 2$, $\phi 3$, and $\phi 4$ can be detected with maximum sensitivities.

The projection data p(r, θ) actually detected at the position N' is approximate to the value obtained by integrating the ideal projection data p*(r, θ) at the position N' and projection data actually detected at the positions N1, N2, N3, N4 . . . with the incident angle dependence S($\phi$). The projection data p#(r, θ) approximate to the ideal projection data p*(r, θ) at the position N' can be estimated, in accordance with the projection data actually detected at the position N' and the projection data actually detected at the positions N1, N2, N3, N4 . . . having the above positional relationship with the position N', using the correcting function T($\phi$) derived from the incident angle dependence S($\phi$) for suppressing the smoothing effect by the incident angle dependence S($\phi$).

Figure 9:
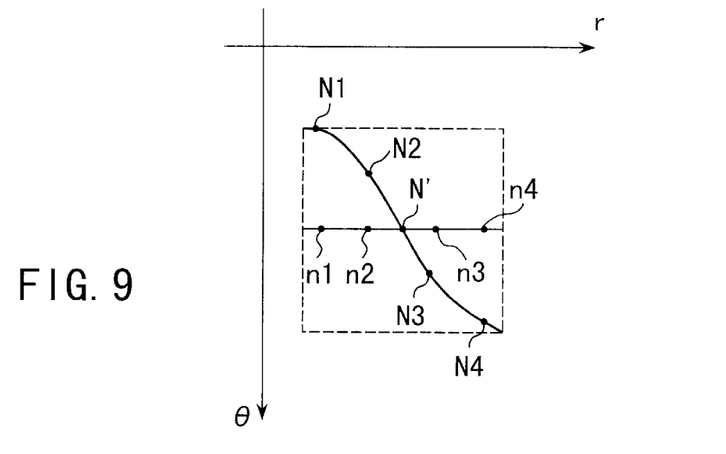
FIG. 9 is a view showing comparison between the method of correcting the projection data of the first embodiment and the conventional method of correcting the projection data.

The positional relationship of the positions N1, N2, N3, N4 . . . with the position N' is represented by the space <r, θ> in FIG. 9. As described above, the plurality of positions N1, N2, N3, N4 . . . with respect to the position N' are defined such that the projection rays K1, K2, K3, and K4 of the positions N1, N2, N3, N4 . . . cross the projection ray K at the position N' within the angle-of-divergence range ($-\Phi$ to $+\Phi$). This point sequence (N', N1, N2, N3, N4) has a positional relationship that rotation angles θ and distances r from the rotation center differ from each other, as can be apparent from FIG. 9. This positional relationship must be discriminated from that of a point sequence of n1, n2, n3, and n4, which are used to filter for changing a spatial resolution and a noise level and have different distances r from the rotation center but have the same rotation angle θ.

As described above, the form of the correcting function T($\phi$) remains unchanged, but a curve (or a straight line) in the space <r, θ> to which the correcting function T($\phi$) is applied changes in accordance with "D" and "r". The one-dimensional integration defined by equation (12) can be assumed to be equivalent to two-dimensional integration (2D filtering) in a rectangular region represented by r'sec $\Phi$+D(θ'−$\Phi$)tan $\Phi$>r>r'sec $\Phi$−D(θ+$\Phi$)tan $\Phi$, θ'+$\Phi$>θ>θ'−$\Phi$, in this case, the correcting function T($\phi$) can be described by a 4-variable function U(r', θ',s, $\phi$) given by:

$$p\#(r', \theta') = \int_{r'-v}^{r'+u} \int_{\theta'-\Phi}^{\theta'+\Phi} U(r', \theta', r-r', \theta-\theta') p(r, \theta) d\theta dr \quad (13)$$

where $u \geq r'(\sec \Phi - 1) + D(\theta' - \Phi)\tan \Phi$ and $v \geq r'(1 - \sec \Phi) + D(\theta' + \Phi)\tan \Phi$.

The values of the correcting function T($\phi$) are plotted along a predetermined curve (or a predetermined straight line) in the rectangular region, and the 4-variable function U is derived on the basis of the correcting function T($\phi$).

Equations (12) and (13) can be used as a discrete calculation such that r=nΔr, r'=nΔr', θ=mΔθ, and θ'=mΔθ' in actual calculations. In this case, the integration process is replaced with the total sum in the same manner as in the conventional case. Equations (12) and (13) perform integrations in units of small intervals in the <r, θ> space, and the calculation amounts are small and practical.

A method of deriving the correcting function T($\phi$) for suppressing the smoothing effect by the incident angle dependence S($\phi$) will be described below.

Figure 8:
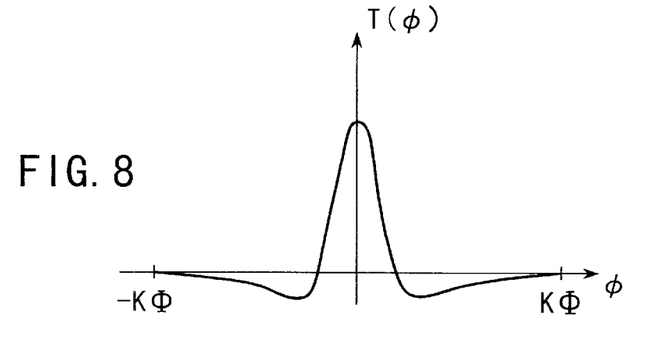
FIG. 8 is a view showing a correcting function T used in the method of correcting the projection data according to the first embodiment.

When the incident angle dependence S($\phi$) of detection sensitivity is regarded as a spatial filter, the correcting function T($\phi$) is essentially derived as an inverse filter (see FIG. 8). More specifically, the Fourier transform Fs($\omega$) of S($\phi$) is computed, a function Ft($\omega$) approximating the reciprocal of Fs($\omega$) is constructed, and the inverse Fourier transform of the approximate function Ft($\omega$) is computed to obtain the inverse filter. In this case, the following two equations are used:

$$Fs(\omega) = \int_{-\infty}^{\infty} S(\phi) e^{-i\phi\omega} d\phi \quad (14)$$

$$T(\phi) = \frac{1}{2\pi} \int_{-\infty}^{\infty} Ft(\omega) e^{i\phi\omega} d\omega \quad (15)$$

Figure 5:
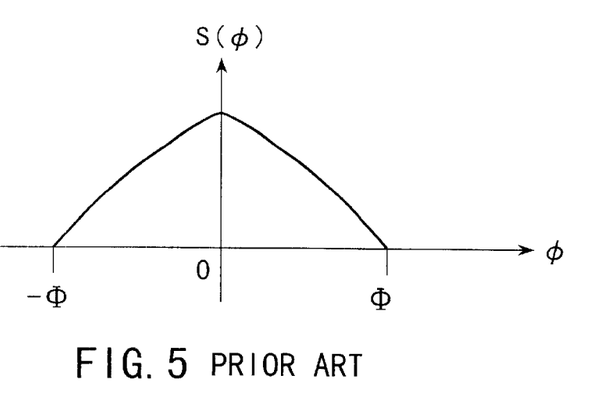
FIG. 5 is a graph showing a function representing the incident angle dependence of detection sensitivity in the conventional collimator.

Note that the plot of the incident angle dependence S($\phi$) of detection sensitivity forms an almost triangular curve, so Fs($\omega$) can be approximated, as shown in FIG. 5, by:

$$Fs(\omega) \leftrightharpoons (\sin(\Phi\omega/2)/(\Phi\omega/2))^2 \quad (16)$$

If $|\omega| = 2\pi/\Phi$, then the right-hand side of equation (16) becomes zero, and its reciprocal does not exist. This is the reason why perfect compensation cannot be performed. An approximate function Ft($\omega$) that satisfies:

$$Ft(\omega) \leftrightharpoons ((\Phi\omega/2)/\sin(\Phi\omega/2))^2 \quad (17)$$

in at least the range of $|\omega|<\omega 0$ for a given value $\omega 0$ ($>0$) smaller than $2\pi/\Phi$ is constructed.

At the same time, T($\phi$) must have non-zero values only in the range of $|\phi|<\Phi$ or $|\phi|<k\Phi$ (k>1) not much larger than of $|\phi|<\Phi$.

T($\phi$) or Ft($\omega$) satisfying the above conditions can be attained by using a so-called hyperresolution method. That is, a function sequence of T1, T2, . . . , Tn is formed and converged to T($\phi$) satisfying the above conditions.

For example, the inverse Fourier transform of a function given by $((\Phi\omega/2) - \sin(\Phi\omega/2))^2$ for $Fr_1(\omega) = |\omega| < \omega$ and otherwise 0 is defined as R1 ($\phi$). If Ti($\phi$)=$|\phi|$<k$\Phi$, then R1 ($\phi$); otherwise, 0. The Fourier transform of T1 ($\phi$) is denoted by $Ft_1(\omega)$.

For n=2, 3, . . . , the inverse Fourier transform of a function given by $((\Phi\omega/2)/\sin(\Phi\omega/2))^2$ for $Fr_n(\omega) = |\omega| < \omega 0$ and otherwise $Ft_{n-1}$ is denoted by Rn($\phi$). If Tn($\phi$)=$|\phi|$<k$\Phi$, then Rn($\phi$); otherwise 0. The Fourier transform of Tn($\phi$) is denoted by $Ft_n(\omega)$.

The same processing as described above is repeated and ended when an appropriate repetition count n=N. The function $T_N$ formed by the above processing is used as a correcting function T. This allows forming a correcting function (correcting filter) T capable of suppressing the smoothing effect of the incident angle dependence S.

Figure 11A:
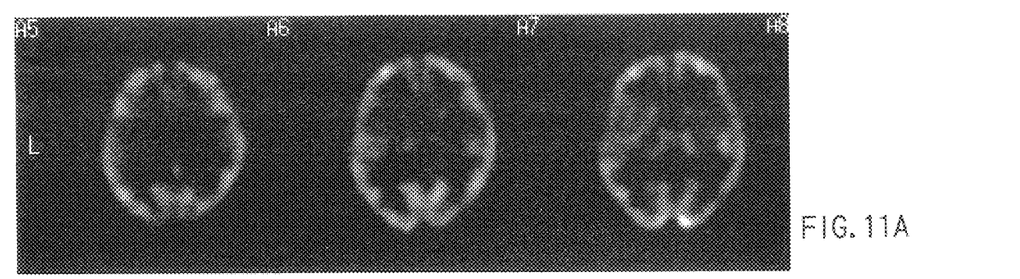
FIG. 11A is a view showing cerebral SPECT images not corrected by the first embodiment.
Figure 11B:
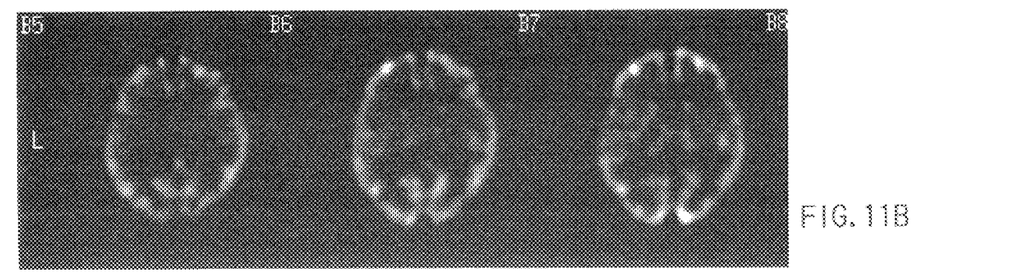
FIG. 11B is a view showing cerebral SPECT images having undergone compensation of the first embodiment.

When the projection data is corrected as described above, the distance dependence of resolution can be effectively suppressed. FIG. 11A shows a cerebral SPECT image without compensation, while FIG. 11B shows a cerebral SPECT image upon applying the compensation of this embodiment to the SPECT image. Obviously, image blur is typically suppressed.

Figure 12:
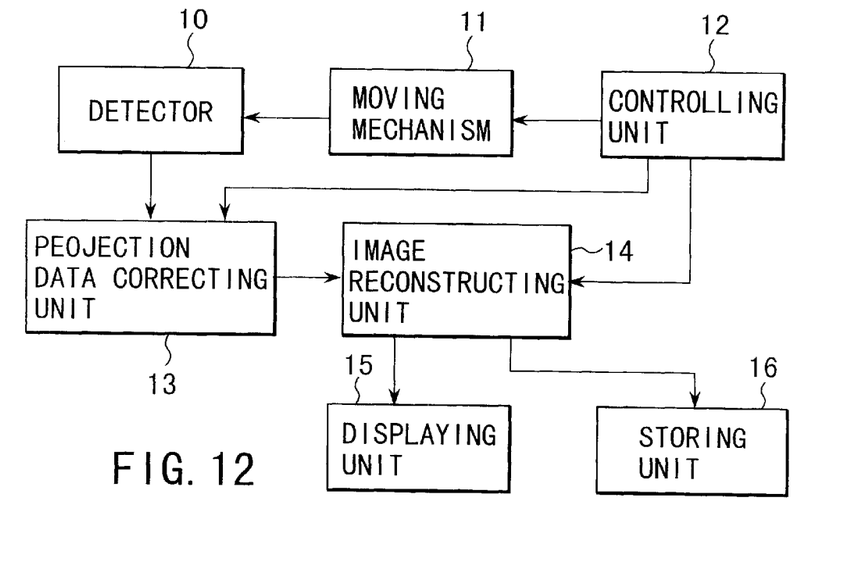
FIG. 12 is a block diagram of a nuclear medical diagnosis apparatus according to the first embodiment.

FIG. 12 is a block diagram showing the arrangement of a nuclear medical diagnosis apparatus according to this embodiment. A detector 10 detects gamma rays emitted from RIs administered to the target object. A moving mechanism 11 moves the detector 10 around the target object. A data correcting unit 13 uses the above-mentioned correcting function to correct the projection data detected by the detector 10. An image reconstructing unit 14 reconstructs a slice density distribution (SPECT image) on the basis of the projection data corrected by the data correcting unit 13. A displaying unit 15 displays a SPECT image generated by the image reconstructing unit 14. A storing unit 16 stores the SPECT image data generated by the image reconstructing unit 14. A controlling unit 12 systematically controls the moving mechanism 11, the data correcting unit 13, and the image reconstructing unit 14 in order to execute projection data acquisition operation corresponding to SPECT.

As the detector 10, a scintillation sensor made up of a combination of a scintillator and photoelectric conversion element (e.g., a photodiode) or a semiconductor sensor made of cadmium telluride (CdTe) or cadmium lead telluride (CdZnTe) can be used.

Figure 13:
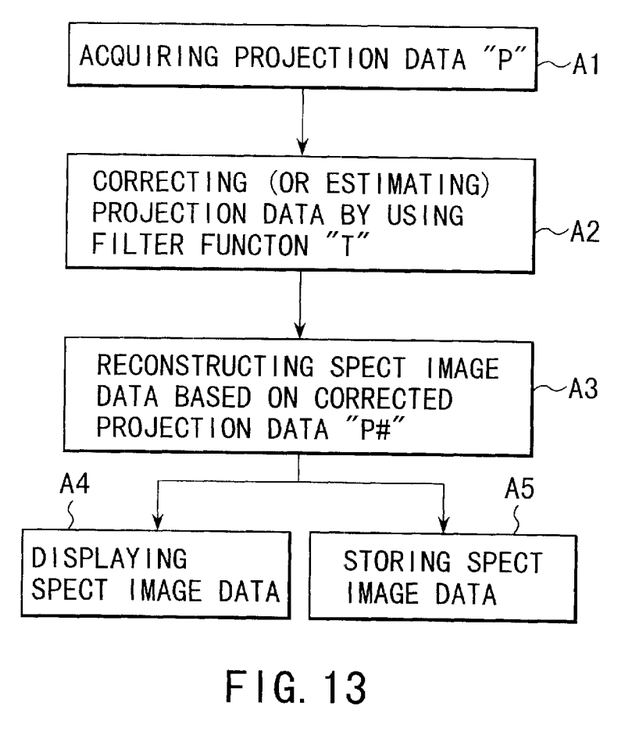
FIG. 13 is a flow chart of projection data acquisition to image reconstruction in the apparatus shown in FIG. 12.

FIG. 13 is a flow chart showing the flow from projection data acquisition to image reconstruction. As shown in FIG. 13, in step A1, the data correcting unit 13 acquires projection data p measured after the detector 10 detects radiation emitted from the target object. The data correcting unit 13 corrects the acquired projection data p using the correcting function T to obtain an estimated value p# approximate to the ideal projection data p* (step A2).

The image reconstructing unit 14 reconstructs an image on the basis of the estimated value p# of the projection data, which is acquired in step A2, thereby obtaining a SPECT image with a high resolution (step A3).

The SPECT image obtained in step A3 is displayed on the displaying unit 15 (step A4) and stored in the storing unit 16 (step A5).

Figure 10:
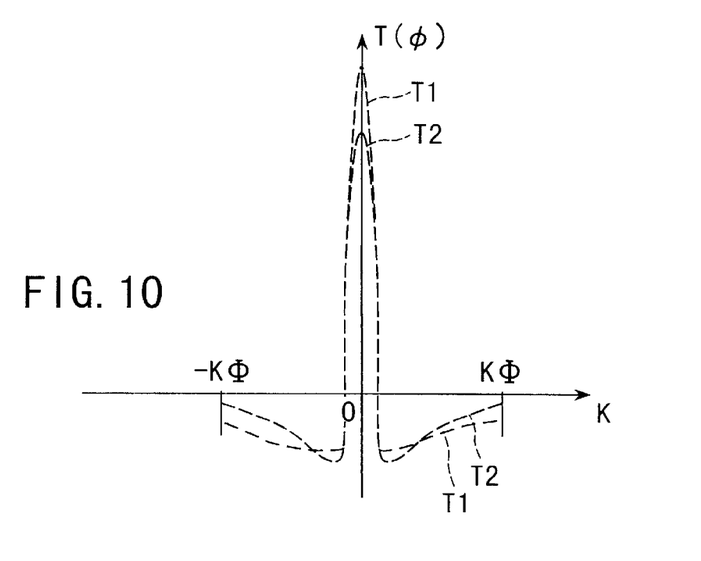
FIG. 10 is a view showing another correcting function T' imparted with a noise reduction effect according to the first embodiment.

Note that a plurality of correcting functions having different filter transfer functions may be stored and selectively used by the data correcting unit 13 in accordance with a user instruction. Other kinds of filter functions include functions having different repetition counts. Filter functions having a noise reduction effect can also be used as other kinds of correcting function. As shown in FIG. 10, a correcting function T' as another kind of correcting function having a noise reduction effect can be obtained by convoluting the correcting function T with a filter function NO having a noise reduction effect.

The first embodiment described above has exemplified a parallel hole type collimator. A slant type collimator in which the axial direction of the collimator holes slants with respect to the detection surface can be applied to the correcting method of this embodiment.

Second Embodiment

The second embodiment of the present invention will exemplify a projection data correcting method when a detector having a slant type collimator thereon moves around the rotation center. As is known well, a convergent type collimator and a divergent type collimator is a specialized slant type collimator. This correcting method is corresponded to the parallel slant type collimator. The method is applicable to the convergent type and the divergent type collimator.

Figure 14:
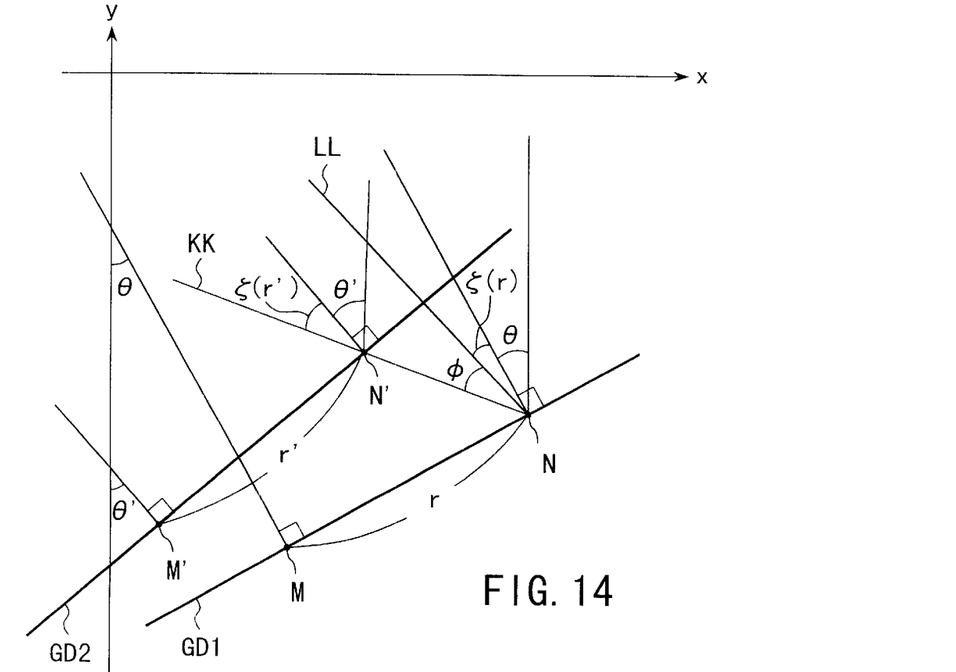
FIG. 14 is a view for explaining the principle of projection data compensation in the second embodiment of the present invention.

FIG. 14 is a view for explaining the principle of the correcting method of this embodiment. The slant angle of the collimator hole is $\zeta(r)$. A collimator having $\zeta(r)=0$ at all positions r on the detection surface corresponds to a parallel hole type collimator. In the second embodiment, since the rotation center is not fixed, the expression "the rotation angle θ" is not appropriate, and θ describes the direction of the detector in the x-y coordinate system.

Referring to FIG. 14, reference symbol M denotes a specific position (e.g., an end position) on a detection surface GD1; and N, a position spaced apart from the position M by a distance r on the detection surface GD1. Assume that projection data actually detected at the position N on the detection surface GD1 is defined as p(r, θ). In an ideal collimator having sharp directivity, the projection data p(r, θ) at the position N is given as ideal projection data p*(r, θ) obtained by integrating an RI density distribution f(x,y) along a straight line (projection line at the position N) LL crossing at the position N at an angle (90°-ζ (r)). The projection data p(r, θ) actually detected at the position N is a value obtained by convoluting the ideal projection data p*(r, θ) as in the first embodiment with the incident angle dependence S(φ) of detection sensitivity.

It is assumed that a straight line KK passes through the position N, inclines by φ with respect to the projection ray LL, and a direction of the detector is "θ'". N' describes a cross position of KK to a detection surface GD2 of the detector oriented at θ'. M' describes a predetermined position on the detection surface GD2, for example an edge position of the detection surface. "r'" describes a distance between the position N' and M'. In this case, the direction θ' so that the direction (θ'-ζ (r)) of the collimator is equal to a direction of the line KK can exist regarding to almost every θ' r and φ. we have:

$$\theta'+\zeta(r')=\theta+\zeta(r)+\phi \tag{18}$$

When θ and r which satisfy equation (18) is obtained, the position N with respect to the position N' can be specified. The projection data actually detected at the position N' is corrected by the filter function T using the projection data actually detected at a plurality of positions N specified by a plurality of angles φ in the same manner as in the first embodiment. This allows obtaining an estimated value close to the ideal projection data. On the basis of the estimated value of the projection data, image reconstruction is performed to obtain a SPECT image with a high resolution.

The second embodiment described above has exemplified a slant type collimator, but a converging type collimator in which the axial directions of collimator holes converge can be applied to the correcting method of this embodiment.

Third Embodiment

The third embodiment of the present invention will exemplify a projection data correcting method using a converging type collimator.

Figure 15:
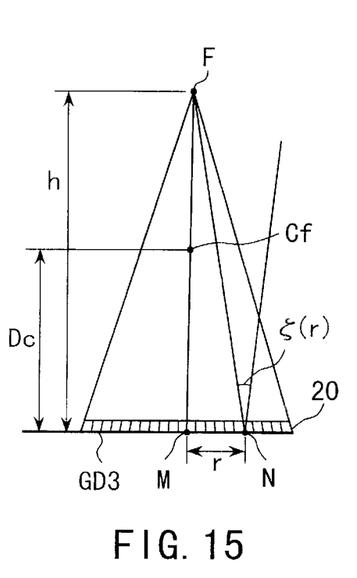
FIG. 15 is a view showing the gamma ray geometry corresponding to a converging type collimator according to the third embodiment of the present invention.
Figure 16:
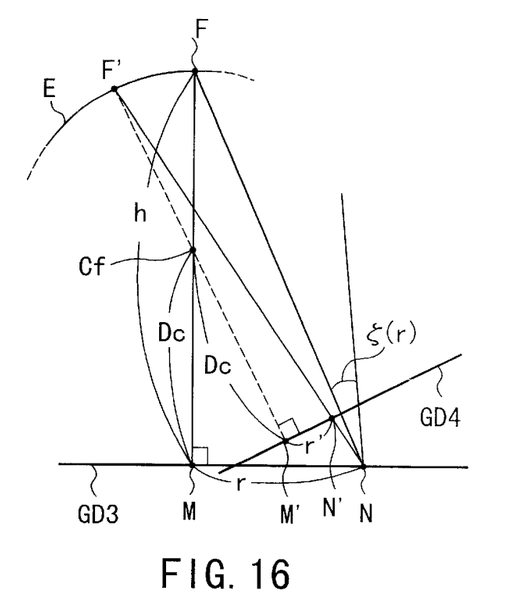
FIG. 16 is a view for explaining the principle of projection data compensation according to the third embodiment of the present invention.

FIGS. 15 and 16 are views for explaining the principle of the correcting method of the third embodiment according to the present invention. Reference symbol M denotes an end position on a detection surface GD3; and N, a position spaced apart from the position M by a distance r on the detection surface GD3. The focal depth of a converging type collimator 20 is h.

In this case, it is assumed that a detector is moved (rotated) about a target object so that a focal point F moves along a circumference E of a circle having a rotation center Cf and radius (h−Dc).

Therefore, we get:

$$\tan(\zeta(r))=r/h \tag{19}$$

That is, $$\zeta(r)=\arctan(r/h) \tag{20}$$

where Dc is a constant.

When the focal point F moves to a focal point F' along the circumference E of the circle by a rotation of the detector, a detector position M' obtained upon movement is located on a straight line connecting the focal point F and the rotation center Cf and spaced apart from the rotation center Cf by the distance Dc. A straight line (surface) passing through the position M' and perpendicular to an extension of a straight line connecting the focal point F' and rotation center Cf corresponds to a gamma ray detection surface GD4. A detection point N' on the gamma ray detection surface GD4 is an intersection between the gamma ray detection surface GD4 and a straight line connecting the focal point F' and the detection point N. Note that r' is the distance between the detection points M' and N' on the detection surface GD4.

In the same manner as in the first embodiment, the projection data at the position N' is corrected using the above-mentioned filter function using the projection data at the position N', thereby obtaining an estimated value close to the ideal projection data. Image reconstruction is performed on the basis of the estimated value of the projection data, thereby obtaining a SPECT image with a high resolution.

Fourth Embodiment

As described above, a collimator disposed on the gamma ray detection surface of a detector has holes each having a finite size (width). In practice, projection data is measured for each detection area having a finite size. To further increase the resolution, the next projection data compensation is performed.

Figure 17:
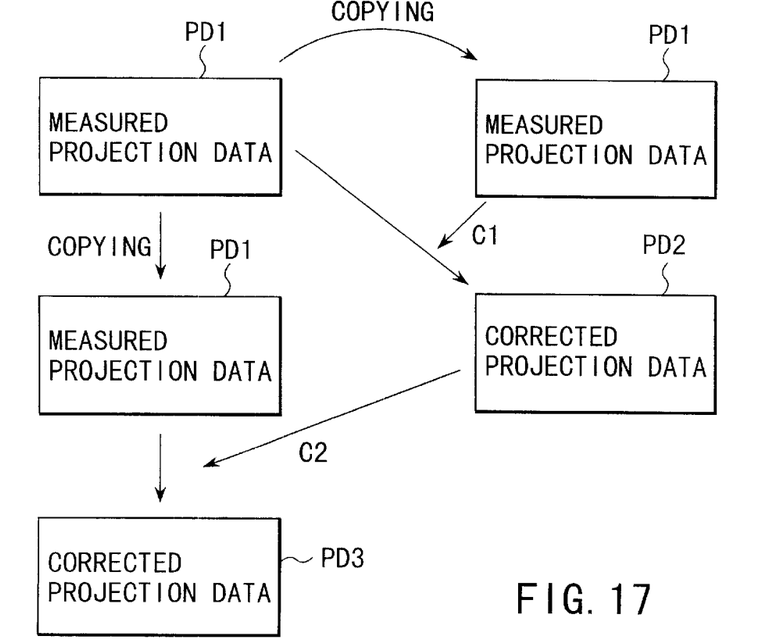
FIG. 17 is a view showing a compensation method of continuously using corrected projection data according to the fourth embodiment of the present invention.

FIG. 17 is a view for explaining processing for correcting projection data measured in a nuclear medical diagnosis apparatus of the fourth embodiment of the present invention. when projection data is measured at the time when the detector is moved to a given position around a target object, the measured projection data is acquired, and this projection data is defined as non-corrected projection data PD1, as shown in FIG. 17. The non-corrected projection data PD1 is copied. Each projection data of the copied projection data PD1 is stored on the basis of neighboring projection data to obtain a correcting value C1.

Compensation is performed on the basis of the correcting value C1 generated for each projection data of the non-corrected projection data PD1 to obtain projection data PD2.

Compensation is performed again for each projection data of the corrected projection data PD2 on the basis of the neighboring projection data to obtain a correcting value C2.

Compensation is performed on the basis of the correcting value C2 generated for each projection data of the copied non-corrected projection data PD1 to obtain finally corrected projection data PD3.

As described above, the data PD3 can have the higher accuracy by using the corrected data PD2. When this correcting process is repeated, the accuracy is increased. This method can estimate data P# further approximate to the ideal projection data P*.

(Modification)

The above embodiments have exemplified methods of two-dimensionally correcting projection data. However, the present invention can be easily applied to a method of three-dimensionally correcting projection data.

Figure 18:
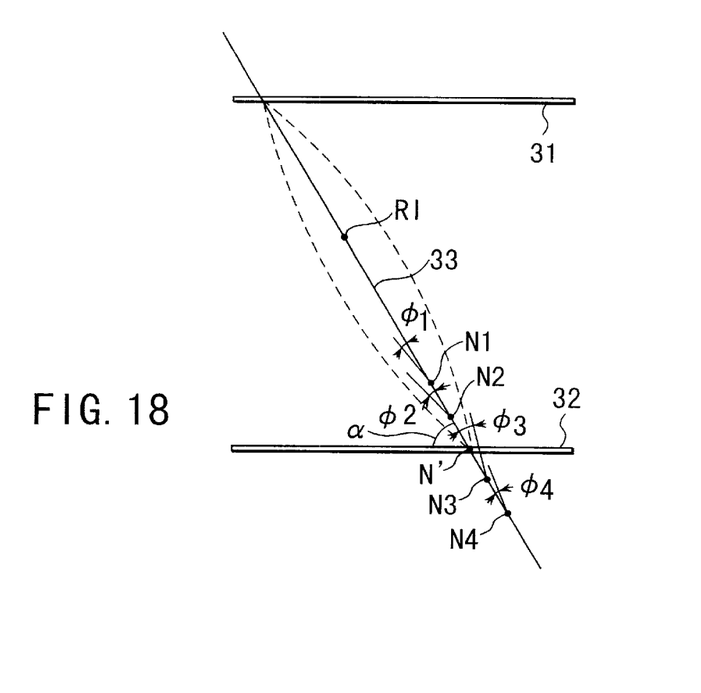
FIG. 18 is a view showing the principle of projection data compensation method applied to PET according to the fifth embodiment of the present invention.

This correcting method can also be applied to PET. As shown in FIG. 18, PET reconstructs an image on the assumption that RIs are present on a straight line 33 connecting two positions where the gamma rays are almost simultaneously detected with two opposing detectors 31 and 32. In practice, however, gamma rays from the RIs (RIs present in the dotted area) present near the straight line 33 are also detected at the position N'. This detection range is determined by the motion of positrons $e^+$ and can be dealt with in the same manner as the angle of divergence ($-\Phi$ to $+\Phi$) described above. As in the above embodiments, a plurality of positions N1, N2, N3, N4 . . . necessary for correcting the projection data of the position N' can be specified on the incident direction 33. As in the above embodiments, the projection data at the position N' can be corrected by a filter function T using the plurality of specified positions N1, N2, N3, N4 . . . .

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A nuclear medical diagnosis apparatus comprising:
   a detector configured to detect gamma rays emitted from radioisotopes administered to a target object;
   a mechanism configured to move said detector with respect to the target object;
   a correcting unit configured to correct projection data detected by said detector on the basis of other projection data detected at a plurality of positions associated with a straight line which passes through a detection position of the projection data and crosses a detection surface of said detector at a predetermined angle; and
   a unit configured to generate a radioisotope density distribution on the basis of the corrected projection data.

2. An apparatus according to claim 1, wherein the predetermined angle corresponds to a direction of a collimator arranged in said detector.

3. An apparatus according to claim 1, wherein the predetermined angle is substantially 90°.

4. An apparatus according to claim 1, wherein the projection data is integrated together with the other projection data.

5. An apparatus according to claim 1, wherein the projection data is integrated with the other projection data using a correcting function derived from the incident angle dependence of detection sensitivity.

6. An apparatus according to claim 5, wherein the correcting function has a characteristic of emphasizing a data component of a gamma ray, which is incident at the predetermined angle.

7. An apparatus according to claim 5, wherein the correcting function has a characteristic of suppressing a data component of a gamma ray which is incident at an angle except the predetermined angle.

8. An apparatus according to claim 5, wherein the correcting function has a characteristic of reducing a data component of a gamma ray which is incident at an angle except the predetermined angle.

9. An apparatus according to claim 5, wherein said correcting unit stores data associated with a plurality of kinds of correcting functions and selectively uses the plurality of kinds of correcting functions in accordance with a user instruction.

10. A nuclear medical diagnosis apparatus comprising:
    a detector configured to detect gamma rays emitted from radioisotopes administered to a target object;
    a mechanism configured to rotate said detector around the target object;

a correcting unit configured to correct projection data, detected by said detector, on the basis of other projection data detected at positions where rotation angles of said detector and distances from a rotation center to projection rays are different with each other; and a unit configured to generate a density distribution of the radioisotopes on the basis of the corrected projection data.

11. An apparatus according to claim 10, wherein projection rays associated with the other projection data at a plurality of positions cross a projection ray at the detection position of the projection data at different angles.

12. A nuclear medical diagnosis apparatus comprising:

a detector configured to detect gamma rays emitted from radioisotopes administered to a target object;

a mechanism configured to move said detector with respect to the target object;

a correcting unit configured to correct projection data, detected by said detector, on the basis of other projection data detected at a plurality of positions on a projection ray of the projection data; and a unit configured to generate a density distribution of the radioisotopes on the basis of the corrected projection data.

13. An image reconstructing method for a nuclear medical diagnosis apparatus, comprising the steps of:

correcting projection data acquired by repeating detection operation of detecting gamma rays emitted from the radioisotopes administered to a target object while changing a position of said detector with respect to the target object; and generating a density distribution of the radioisotopes on the basis of the corrected projection data, wherein the correcting step comprises correcting the projection data, detected by said detector, on the basis of other projection data detected at a plurality of positions associated with a line which passes through a detection position of the projection data and crosses a detection surface of said detector at a predetermined angle.

14. A memory storing computer-executable program code, the program code comprising:

means for causing the computer to correct acquired projection data by repeating detection operation of detecting gamma rays emitted from radioisotopes administered to a target object while changing a position of said detector with respect to a target object; and means for causing the computer to generate a density distribution of the radioisotopes on the basis of the corrected projection data, wherein said correcting means corrects the projection data, detected by said detector, on the basis of other projection data detected at a plurality of positions associated with a straight line which passes through a detection position of the projection data and crosses a detection surface of said detector at a predetermined angle.

* * * * *